C. H. STRATTON.
Side-Hill Plow.
No. 160,625.   Patented March 9, 1875.
Fig: 1.
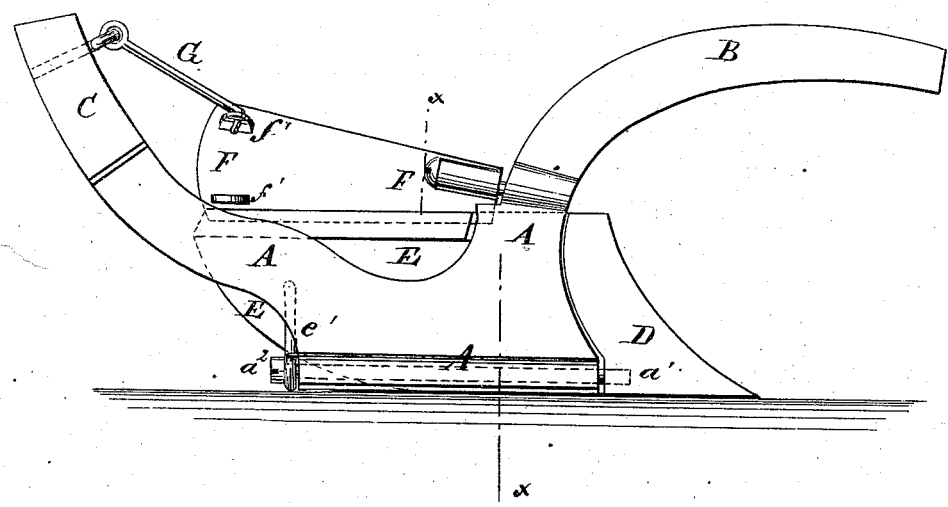
Fig: 2.
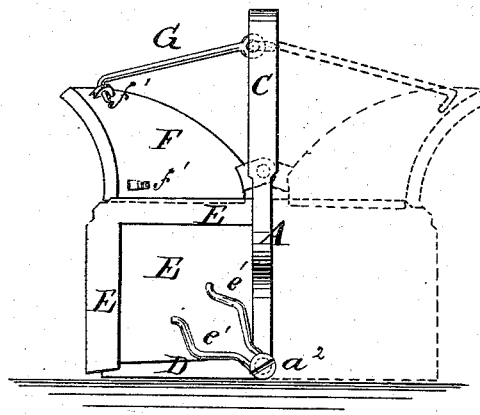
Fig: 3.
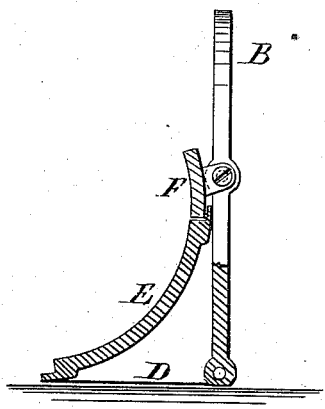
WITNESSES:
Chas. Nida
A. F. Terry
INVENTOR:
Chas. H. Stratton
BY
ATTORNEYS.
THE GRAPHIC CO. PHOTO-LITH. 39 & 41 PARK PLACE, N.Y.

UNITED STATES PATENT OFFICE.

CHARLES HENRY STRATTON, OF MONROETON, PENNSYLVANIA.

IMPROVEMENT IN SIDE-HILL PLOWS.

Specification forming part of Letters Patent No. 160,625, dated March 9, 1875; application filed December 19, 1874.

*To all whom it may concern:*

Be it known that I, CHARLES H. STRATTON, of Monroeton, in the county of Bradford and State of Pennsylvania, have invented a new and useful Improvement in Reversible or Side-Hill Plow, of which the following is a specification:

Figure 1 is a side view of my improved plow. Fig. 2 is a rear view of the same. Fig. 3 is a vertical section of the same, taken through the line $x\ x$, Fig. 1.

Similar letters of reference indicate corresponding parts.

My invention has for its object to furnish an improved reversible or side-hill plow, which shall be so constructed as to turn the furrow perfectly, producing a plow that will work equally well upon inclined and level land, so as to do away with all dead furrows, and which shall at the same time be simple in construction and convenient in use.

The invention consists in the mold-board of a reversible plow, made in two parts, and so arranged that the one part may swing or turn below, and the other above, the land-side of said plow, as hereinafter fully described.

A is the land side, which is provided with a beam, B, and handles C in the usual way. D is the share, and E is the mold-board, which are pivoted to the base of the land-side A by the pivot $a^1$ formed upon the forward end of said base, and by the arm $e'$ formed upon the mold-board E, and which works upon the screw-bolt $a^2$, screwed into the rear end of said base, so that the plow can be reversed by turning the mold-board E beneath the land-side A. F is a wing or extension mold-board, the forward end of which is pivoted to the upper forward part of the land-side A, or to the rear end of the beam B, so that the said wing may be turned over the land-side A to either side, as shown in full and dotted lines in Fig. 2. The opposite edges of the mold-board E are rabbeted, as shown in Fig. 3, to form a seat for the lower edge of the wing F upon whichever side of the land-side A the said mold-board and wing may be. Upon the upper and lower parts of the wing F are formed lugs $f'$ to receive the hook G, pivoted to the lower part of the handles C in such a way that it may be turned to either side. The hook G thus secures the wing F and mold-board E in place when adjusted, and at the same time allows the wing and mold-board to be easily and quickly reversed, the mold-board passing below, and the wing above, the land-side A.

Having thus described my invention, I claim as new and desire to secure by Letters Patent—

In hill-side plows, a mold-board, made in two longitudinal reversely-tapered sections, E F, as shown, the former turning under and the latter over the land-side, as and for the purpose specified.

CHARLES HENRY STRATTON.

Witnesses:
   W. L. MCCLURE,
   D. J. SWEET.